United States Patent
Yamashita (10) Patent No.: US 10,540,222 B2
(45) Date of Patent: Jan. 21, 2020

(54) DATA ACCESS DEVICE AND ACCESS ERROR NOTIFICATION METHOD

(71) Applicant: Renesas Electronics Corporation, Tokyo (JP)

(72) Inventor: Hajime Yamashita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 103 days.

(21) Appl. No.: 15/957,800

(22) Filed: Apr. 19, 2018

(65) Prior Publication Data
US 2018/0373582 A1    Dec. 27, 2018

(30) Foreign Application Priority Data

Jun. 22, 2017   (JP) .................................. 2017-121981

(51) Int. Cl.
*G06F 11/00*      (2006.01)
*G06F 11/07*      (2006.01)

(52) U.S. Cl.
CPC ...... *G06F 11/0784* (2013.01); *G06F 11/0751* (2013.01)

(58) Field of Classification Search
CPC ............. G06F 9/30189; G06F 9/30043; G06F 9/30058; G06F 9/3005; G06F 9/3802; G06F 9/3806; G06F 9/3842; G06F 9/3844; G06F 9/3861; G06F 9/3867; G06F 11/00; G06F 11/0703; G06F 11/0745; G06F 11/0751; G06F 11/0784; G06F 11/0793; G06F 11/141; G06F 11/3027; G06F 13/16; G06F 12/0831; G06F 12/0862
See application file for complete search history.

(56) References Cited

U.S. PATENT DOCUMENTS

| | | | |
|---|---|---|---|
| 5,692,169 A | 11/1997 | Kathail et al. | |
| 5,717,852 A * | 2/1998 | Izuno | G06F 11/2007 714/2 |
| 5,717,931 A * | 2/1998 | Sapir | G06F 13/1605 710/240 |
| 5,864,692 A | 1/1999 | Faraboschi et al. | |
| 6,763,415 B1 * | 7/2004 | Tischler | G06F 13/362 710/107 |

(Continued)

OTHER PUBLICATIONS

Extended European Search Report dated Dec. 19, 2018 for European Patent Application No. 18167775.8-1216.

*Primary Examiner* — Michael Maskulinski
(74) *Attorney, Agent, or Firm* — McDermott Will & Emery LLP (57) ABSTRACT

Error notification by a bus master for a speculative access and error notification by a bus slave for a non-speculative access are achieved while a circuit scale of the bus master is suppressed. A bus request includes mode information for selecting that error notification for an access is performed by the bus slave or the bus master. In a case where the mode information indicating that error notification is performed by the bus slave is included in the bus request, when an error for an access in that bus request has occurred, the bus slave performs error notification. In a case where execution of an instruction of a speculative load access has been fixed and error information for the load access has been received from the bus slave, the bus master performs error notification based on the error information.

8 Claims, 6 Drawing Sheets

(56) References Cited

U.S. PATENT DOCUMENTS

| | | |
|---|---|---|
| 8,209,565 B2 | 6/2012 | Akaike et al. |
| 8,990,641 B2 | 3/2015 | Gollub et al. |
| 2013/0138847 A1* | 5/2013 | Lai .......................... G06F 13/00 710/110 |
| 2018/0293122 A1* | 10/2018 | Craske .................. G06F 11/079 |

* cited by examiner

DATA ACCESS DEVICE AND ACCESS ERROR NOTIFICATION METHOD

CROSS-REFERENCE TO RELATED APPLICATIONS

The disclosure of Japanese Patent Application No. 2017-121981 filed on Jun. 22, 2017 including the specification, drawings and abstract is incorporated herein by reference in its entirety.

BACKGROUND

The present invention relates to a data access device and an access error notification method.

To improve an access performance, an access method is sometimes used, which executes speculative load for a bus slave, such as a RAM (Random Access Memory). With regard to an error detected in the bus slave in an access to the bus slave, it is possible to immediately notify an error processing unit or the like of that error by the bus slave. However, in a case where that access is a speculative access, it may be necessary to refrain from error notification to the error processing unit or the like. Regarding this, U.S. Pat. No. 5,864,692 states that, with regard to an error occurring in a process in association with a speculative instruction, the error should not be reported before it is determined whether that instruction is actually necessary.

For example, for speculative load, acquired read data may become invalid because of cancellation of a branch or the like due to a failure of prediction. In this case, it is necessary to prevent notification of an error detected in a bus slave for a load access. As a configuration for achieving this, a configuration can be considered in which, when an error has occurred in association with speculative load, a bus slave notifies a bus master of occurrence of the error without immediately notifying an error processing unit or the like of the error, and the bus master performs error notification at a time when it is fixed the speculative load is necessary.

That is, with regard to an error in an access that is not speculative, the bus slave is required to perform error notification and, with regard to an error in a speculative access, the bus master is required to perform error notification.

SUMMARY

Because the bus slave cannot discriminate whether or not an access from the bus master is speculative, it is necessary to uniformly decide whether error notification is performed by the bus slave or the bus master. Therefore, in a case where both a bus slave to which a speculative access may be made by the bus master and a bus slave to which only a non-speculative access is made by the bus master are access targets of the bus master, two different bus configurations are required. The first bus configuration assumes that a speculative access is made, and includes a bus to which the bus slave that is a destination of the speculative access is coupled. The second bus configuration assumes a non-speculative access only, and is a bus to which the bus slave only receiving the non-speculative access is coupled. Therefore, the bus master has to be provided with a circuit that achieves a bus master function for the first bus configuration and a circuit that achieves a bus master function for the second bus configuration, resulting in increase of a circuit scale of the bus master.

Other objects and novel features will be apparent from the description of this specification and the accompanying drawings.

According to an embodiment, a bus request includes mode information for selecting whether notification of an error for an access is performed by a bus slave or a bus master. In a case where the bus request includes the mode information indicating that error notification is performed by the bus slave, the bus slave performs error notification when an error for an access in the bus request occurs. In a case where execution of an instruction of a speculative load access has been fixed and error information for the load access has been received from the bus slave, the bus master performs error notification based on the error information.

According to the aforementioned embodiment, it is possible to achieve error notification by the bus master for a speculative access and error notification by the bus slave for a non-speculative access, while a circuit scale of the bus master is suppressed.

DETAILED DESCRIPTION

For clarifying explanation, the following description and the drawings are omitted and simplified as appropriate. Throughout the drawings, the same component is labeled with the same reference sign, and redundant description is omitted as necessary.

Discussions Leading to Embodiments

Figure 1:
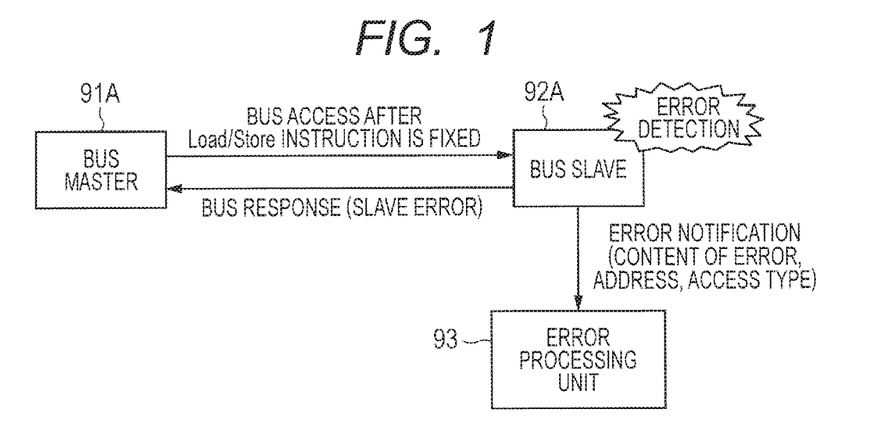
FIG. 1 is a schematic diagram illustrating error notification by a bus slave.
Figure 2:
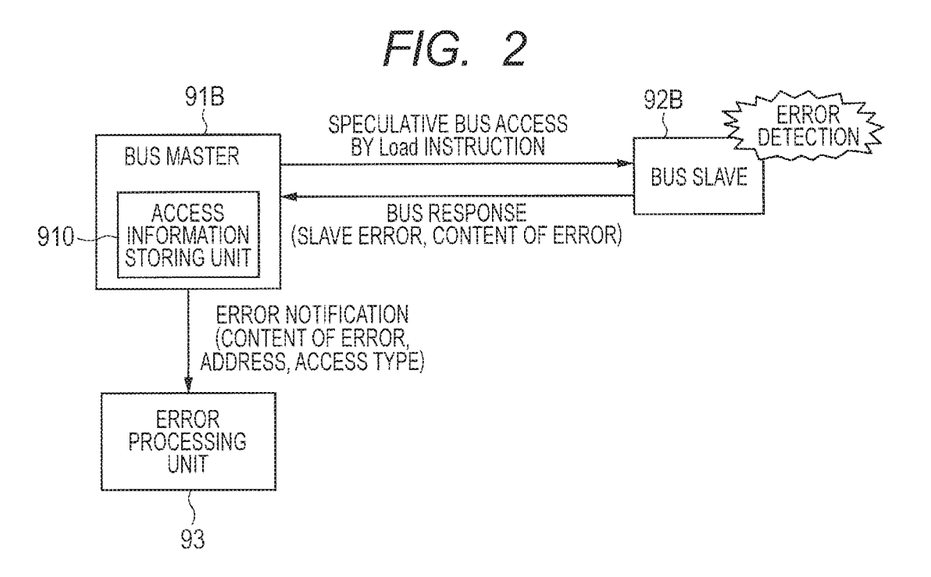
FIG. 2 is a schematic diagram illustrating error notification by a bus master.

First, a related technique is described before embodiments are described. FIG. 1 is a schematic diagram illustrating error notification by a bus slave. FIG. 2 is a schematic diagram illustrating error notification by a bus master. Error notification is described below with reference to FIGS. 1 and 2.

First, error notification by a bus slave 92A is described with reference to FIG. 1. In a case where the bus slave 92A has detected an error of some kind for an access by a bus master 91A, the bus slave 92A sends a bus response indicating occurrence of the error to the bus master 91A and also performs error notification to an error processing unit 93. The error notification includes the content of the error indicating a factor of the occurrence of the error and the like, an access destination address, and an access type. The access type is information that indicates a type of an access (for example, a load access, a store access, and an access with exclusive control). This error notification by a bus slave should be performed in a case where the access by the bus master 91A is a non-speculative access (for example, an access after a load access instruction is fixed or an access after a store access instruction is fixed).

Next, error notification by a bus master 91B is described with reference to FIG. 2. When making an access, the bus master 91B retains an access destination address and an access type in an access information storing unit 910 provided in the bus master 91B. In a case where a bus slave 92B has detected an error of some kind for the access by the bus master 91B, the bus slave 92B sends a bus response indicating occurrence of the error to the bus master 91B. This bus response includes the content of the error. At this time, the bus slave 92B does not perform error notification to the error processing unit 93. The bus master 91B that has received the bus response indicating the occurrence of the error from the bus slave 92B reads out information stored in the access information storing unit 910 and performs error notification to the error processing unit 93 at a time when execution of an instruction of an access to the bus slave 92B is fixed. That is, in a case of error notification by a bus master, the process waits for fixing of execution of an instruction, and then error notification to the error processing unit 93 is performed by the bus master 91B. This error notification by the bus master should be performed in a case where the access by the bus master 91B is a speculative load access.

Figure 3:
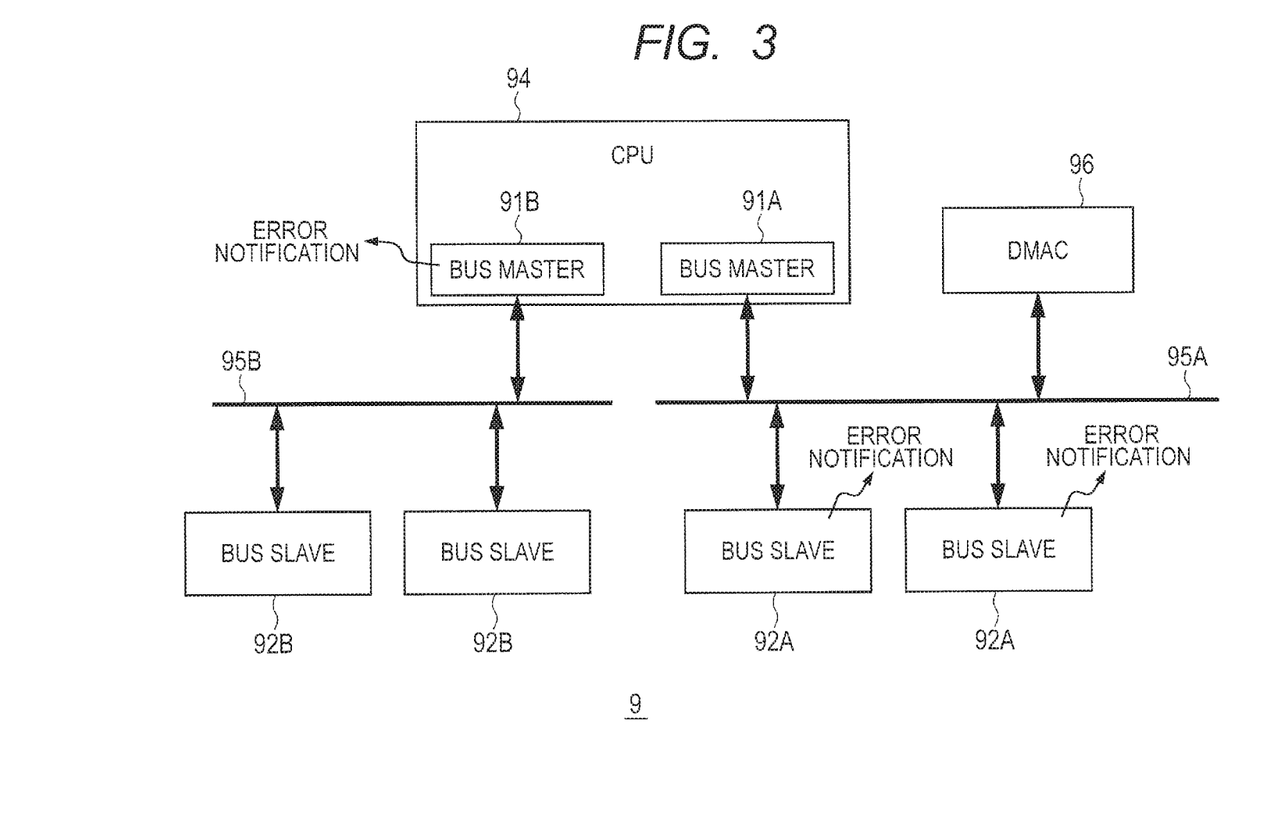
FIG. 3 is a block diagram of a data access device according to a related technique.

FIG. 3 is a block diagram of a data access device 9 according to a related technique. In the configuration illustrated in FIG. 3, the data access device 9 includes a bus 95A and a bus 95B to achieve an access to the bus slave 92A and an access to the bus slave 92B, both by a CPU 94. The CPU 94 of the data access device 9 includes the bus master 91A that controls an access via the bus 95A and the bus master 91B that controls an access via the bus 95B. The data access device 9 also includes the bus slave 92A connected to the bus 95A and the bus slave 92B connected to the bus 95B. That is, the data access device 9 includes a first bus configuration included by the bus master 91B, the bus 95B, and the bus slave 92B and a second bus configuration included by the bus master 91A, the bus 95A, and the bus slave 92A.

In the first bus configuration, error notification to the error processing unit 93 is performed by the bus master 91B as described with reference to FIG. 2, irrespective of whether an access is speculative or non-speculative. In the second bus configuration, error notification to the error processing unit 93 is performed by the bus slave 92A as described with reference to FIG. 1. In the second bus configuration, a non-speculative access is made, but no speculative access is made. The data access device 9 may include a bus master that does not deal with error notification by the bus master, such as a DMAC (Direct Memory Access controller) 96, which is coupled to the bus 95A, as illustrated in FIG. 3. That is, the first bus configuration assumes that a speculative access is made, and the second bus configuration assumes a non-speculative access only.

As described above, in the data access device 9 according to the related technique, the CPU 94 has to include the bus master 91B for the first bus configuration and the bus master 91A for the second bus configuration. Therefore, increase of a circuit scale of bus masters is caused. Further, it is necessary to provide the bus 95B for the first configuration and the bus 95A for the second configuration. This leads to increase of a circuit scale of the data access device 9.

First Embodiment

Figure 4:
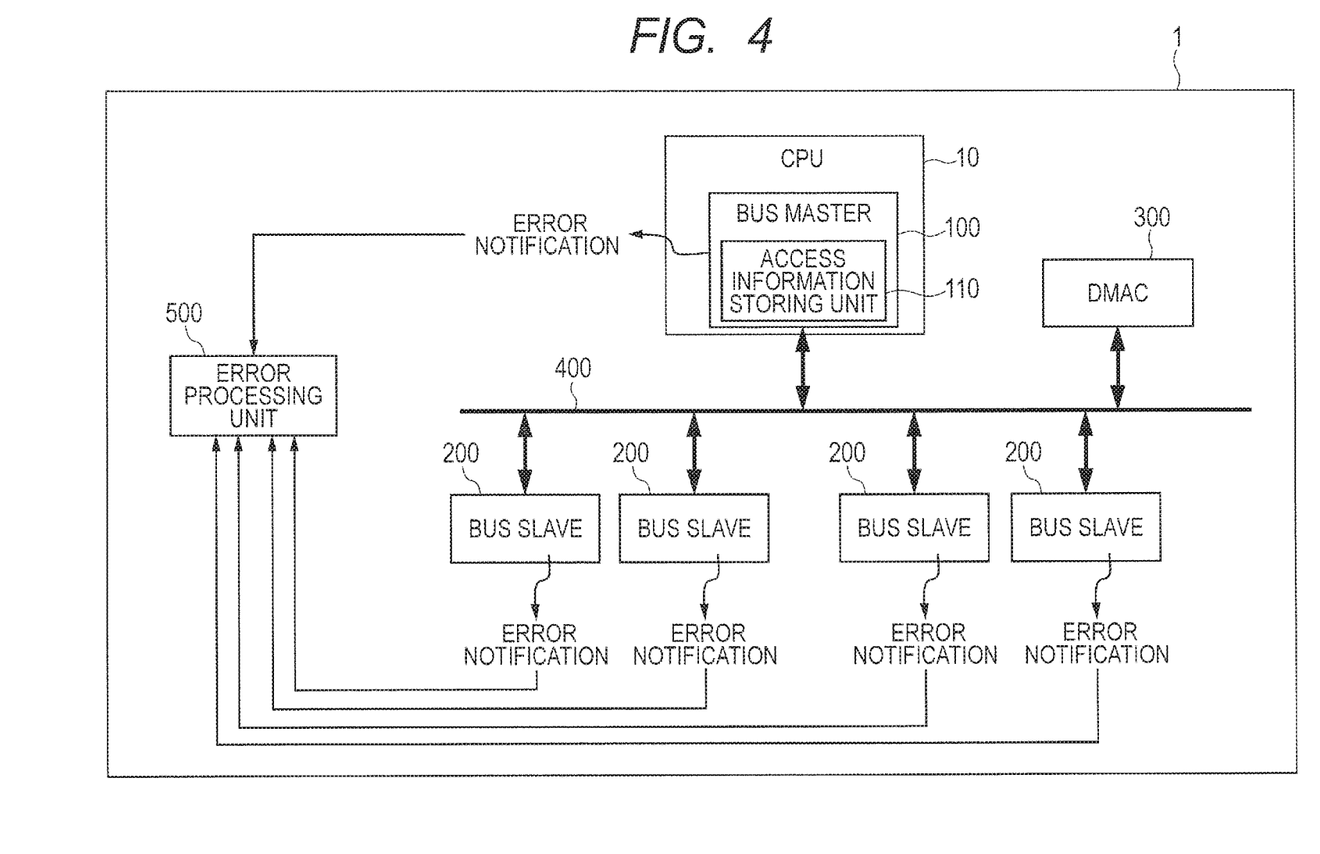
FIG. 4 is a block diagram of a configuration example of a data access device according to a first embodiment.
Figure 5:
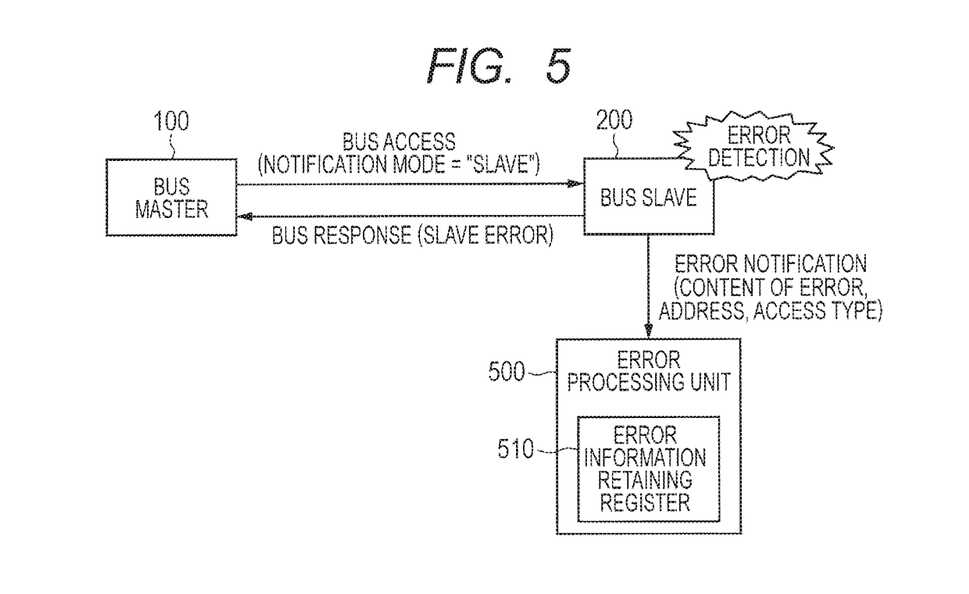
FIG. 5 is a schematic diagram illustrating how error notification by a bus slave is performed in the data access device according to the first embodiment.
Figure 6:
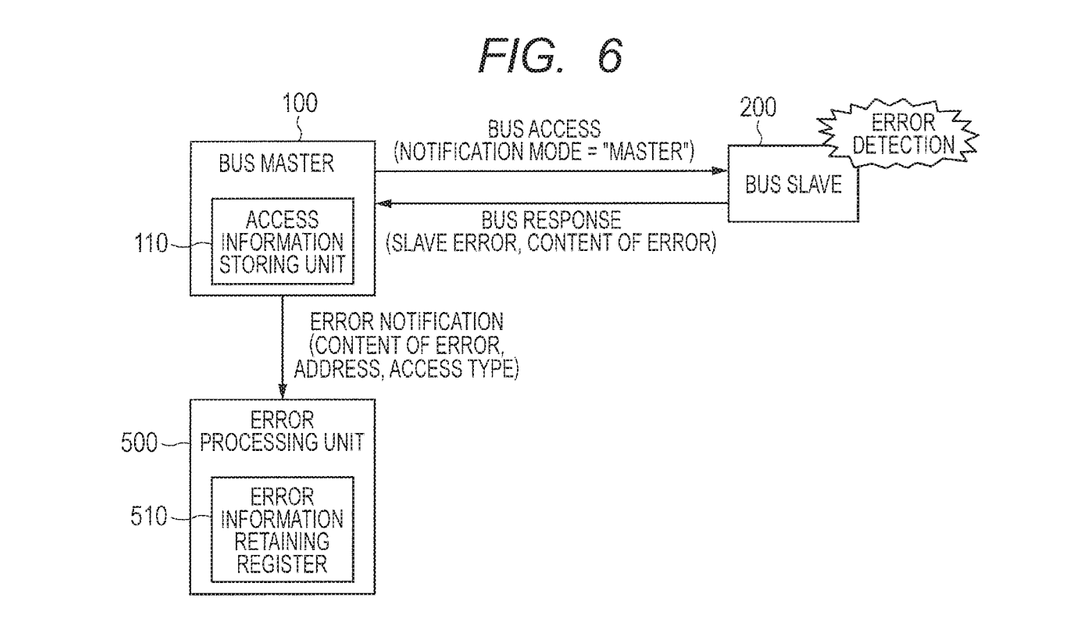
FIG. 6 is a schematic diagram illustrating how error notification by a bus master is performed in the data access device according to the first embodiment.

Next, a first embodiment is described. FIG. 4 is a block diagram of a configuration example of a data access device 1 according to the first embodiment. FIG. 5 is a schematic diagram illustrating how error notification by a bus slave 200 is performed in the data access device 1 according to the first embodiment. FIG. 6 is a schematic diagram illustrating how error notification by a bus master 100 is performed in the data access device 1 according to the first embodiment.

As illustrated in FIG. 4, the data access device 1 includes a CPU 10 including the bus master 100, the bus slave 200, a DMAC 300, a bus 400, and an error processing unit 500. These components described below are achieved by hardware circuits. However, a portion or the whole of the configuration can be implemented by software.

In the present embodiment, an access from the CPU 10 or the DMAC 300 to the bus slave 200 is made by using one bus 400. That is, the bus 400 is a common bus to which the bus slave 200, the bus master 100, and the DMAC 300 are coupled. In the data access device 1, the bus master 100 of the CPU 10 and the DMAC 300 make an access to the bus slave 200. Although in the data access device 1 having the configuration illustrated in FIG. 4, the bus slave 200 is accessible by the bus master 100 and the DMAC 300, the bus slave 200 can be accessible from the bus master 100 only. That is, the data access device 1 may not include the DMAC 300. Further, one or more of the bus slaves 200 illustrated in FIG. 4 are bus slaves that are speculative access targets, and the remaining one(s) is/are not the speculative access targets. However, all the illustrated bus slaves 200 can be speculative access targets.

The CPU 10 executes a program stored in a memory. In execution of the program, the CPU 10 speculatively executes an instruction based on prediction of a branch. That is, accesses from the bus master 100 to the bus slave 200 include a speculative access. The CPU 10 makes a speculative access to the bus slave 200 for which a speculative access causes no problem if being made (that is, the bus slave 200 in which an intended operation is not caused even if a speculative access is made). In other words, the CPU 10 only makes a non-speculative access to the bus slave 200 for which an unintended operation may be caused if a speculative access is made. That is, for the CPU 10, only a predetermined bus slave 200 of the bus slaves 200 included in the data access device 1 is a speculative access target.

The bus master 100 (a first bus master) notifies the bus slave 200 of a bus request and makes an access to the bus slave 200. The bus request includes mode information for selecting whether notification of an error for the access is performed by a bus slave or a bus master. Therefore, the bus request includes access information (address and an access type) and the mode information. Further, the bus master 100 includes an access information storing unit 110 that is a buffer memory and, when notifying the bus slave 200 of the bus request, stores the access information in the access information storing unit 110. The access information includes an access destination address and an access type.

In a case of making a non-speculative access to the bus slave 200, the bus master 100 notifies the bus slave 200 of the bus request while making the bus request include the mode information indicating that the bus slave performs error notification. That is, in this case, the bus master 100 issues a bus request that specifies "slave" as a mode, as illustrated in FIG. 5. Examples of the non-speculative access include a load access (an access by a load instruction), a store access (an access by a store instruction), an access with exclusive control (an access by an instruction for an exclusive control function, such as an LDL (Load-Linked) instruction and an STC (Store-Conditional) instruction).

As described above, the bus master 100 may make a speculative access to the bus slave 200 in association with prediction of a branch by the CPU 10. In a case of making a speculative load access to the bus slave 200, such as a memory, the bus master 100 notifies the bus slave 200 of the bus request while making the bus request include the mode information indicating that error notification is performed by the bus master. That is, in this case, the bus master 100 issues a bus request that specifies "master" as the mode, as illustrated in FIG. 6. Then, in a case where execution of an instruction of the speculative load access has been fixed and error information for this load access has been received from the bus slave 200, the bus master 100 performs error notification to the error processing unit 500. In the present embodiment, in error notification to the error processing unit 500, the bus master 100 notifies the error processing unit 500 of the error information received from the bus slave 200 and the access information stored in the access information storing unit 110. Specifically, in the present embodiment, the bus master 100 stores the content of an error and the access information in an error information retaining register 510 provided in the error processing unit 500.

The DMAC 300 (a second bus master) is an example of a bus master that only makes a non-speculative access to the bus slave 200. The DMAC 300 notifies the bus slave 200 of the bus request described above and makes an access to the bus slave 200. The DMAC 300 does not make a speculative access. Therefore, when making an access to the bus slave 200, the DMAC 300 notifies the bus slave 200 of the bus request while making the bus request include mode information indicating that error notification is performed by the bus slave. That is, the DMAC 300 issues a bus request that specifies "slave" as the mode, as in the example illustrated in FIG. 5.

The bus slave 200 is any device that is a target of an access from the bus master 100, and can be a memory or a peripheral I/O (Input/Output) device, for example. The bus slave 200 makes an access specified by the bus request sent from the bus master 100 or the DMAC 300. For example, for a load access, the bus slave 200 reads out data at a specified address and sends the read data to a requester as a bus response. Also, for a store access, the bus slave 200 stores data at a specified address.

The bus slave 200 notifies the requester whether a requested access has been successfully completed, by the bus response. In a case where the requested access has not been successfully completed, that is, the bus slave 200 has detected an error for the requested access, the bus slave 200 sends back error information as the bus response.

In a case where the mode information indicating that the bus slave performs error notification is included in the bus request, that is, in a case where the bus slave 200 has received the bus request specifying "slave" as the mode, the bus slave 200 notifies the requester of information indicating occurrence of an error (a slave error) as error information, as illustrated in FIG. 5. Although FIG. 5 illustrates sending and receiving between the bus master 100 and the bus slave 200, the bus slave 200 also notifies the DMAC 300 of information indicating occurrence of an error (a slave error) as the error information for the bus request from the DMAC 300 when an error has occurred. In the present embodiment, in a case where the bus slave 200 has received the bus request specifying "slave", the bus slave 200 sends the error information to the requester when an error has occurred. However, this sending of the error information can be omitted. Further, the bus slave 200 can send error information including the content of the error to the requester.

Furthermore, in a case where the bus request includes the mode information indicating that the bus slave performs error notification, when an error for an access in this bus request has occurred, the bus slave 200 performs error notification to the error processing unit 500. Specifically, in the present embodiment, for the bus request including the mode information indicating that the bus slave performs error notification, the bus slave 200 stores the content of the error and access information in the error information retaining register 510 provided in the error processing unit 500 at a time of detecting the error.

Meanwhile, in a case where the bus request includes the mode information indicating that error notification is performed by the bus master, that is, in a case where the bus slave 200 has received the bus request specifying "master" as the mode, the bus slave 200 notifies the requester of information indicating occurrence of the error (a slave error) and the content of the detected error as error information, as illustrated in FIG. 6.

In other words, in a case where the bus request includes the mode information indicating that the bus master performs error notification, when an error for an access in this bus request has occurred, the bus slave 200 sends the error information to the bus master 100 that is the requester. Thus, in a case where execution of an instruction has been fixed, error notification is performed by the bus master 100. In other words, in a case where it has been fixed that load data becomes invalid (that is, in a case where it has been found that branch prediction fails), no error notification is performed.

The error processing unit 500 is a module that performs a predetermined process based on information notified from the bus master 100 or the bus slave 200. For example, the error processing unit 500 can perform a process of resetting any component of the data access device 1 (for example, the CPU 10) or a process of displaying and outputting the content of an error, as the predetermined process. In the present embodiment, the error processing unit 500 includes the error information retaining register 510, and performs the predetermined process based on the content of an error stored in the error information retaining register 510 and access information. Because notification to the error processing unit 500 is performed in this manner, it is possible to perform an appropriate process in accordance with the error.

Figure 7:
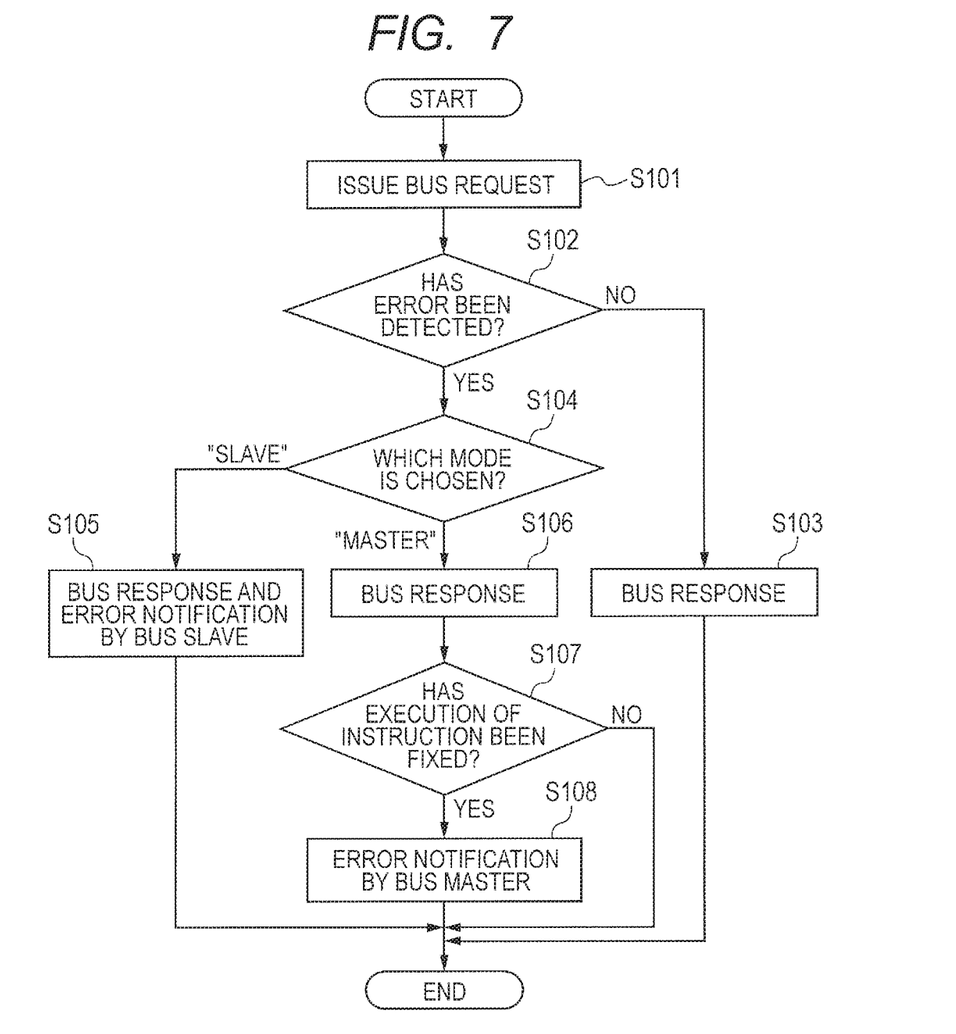
FIG. 7 is a flowchart of an example of an error notification operation in the data access device according to the first embodiment.

Next, an error notification operation in the data access device 1 is described. FIG. 7 is a flowchart of an example of the error notification operation in the data access device 1 according to the first embodiment. A flow of the error notification operation is described below, with reference to the flowchart of FIG. 7.

In Step 101 (S101), the bus master 100 or the DMAC 300 issues a bus request.

In Step 102 (S102), the bus slave 200 that is an access target of the bus request issued in Step 101 makes an access in accordance with the received bus request. The bus slave 200 also monitors whether an error has occurred in association with that access. In a case where the bus slave 200 has not detected the error, the process moves to Step 103.

Meanwhile, in a case where the bus slave 200 has detected the error, the process moves to Step 104.

In Step 103 (S103), the bus slave 200 sends a bus response indicating that the requested access has been made normally, to the bus master 100 or the DMAC 300 that has issued the bus request in Step 101.

Meanwhile, in Step 104 (S104), the bus slave 200 checks mode information included in the received bus request. In a case where the mode information indicates that a bus slave performs error notification, the process moves to Step 105. In a case where the mode information indicates that a bus master performs error notification, the process moves to Step 106.

In Step 105 (S105), the bus slave 200 sends a bus response including error information to the bus master 100 or the DMAC 300 that has issued the bus request in Step 101, and also performs error notification to the error processing unit 500.

In Step 106 (S106), the bus slave 200 sends a bus response indicating error information to the bus master 100 that has issued the bus request in Step 101. The bus master 100 that has issued the bus request then receives this bus response.

After Step 106, in Step 107 (S107), the bus master 100 determines whether execution of an instruction related to the bus request issued in Step 101 has been fixed. In a case where execution of the instruction has been fixed, that is, speculation has succeeded, the process moves to Step 108. In a case where execution of the instruction has not been fixed, that is, speculation has failed, error notification to the error processing unit 500 is not performed.

In Step 108 (S108), the bus master 100 performs error notification to the error processing unit 500. Although the flowchart in which execution of the instruction is fixed after the bus response is received is illustrated in the example of FIG. 7, success or failure of speculation may be determined after the bus response is received. In any case, error notification by the bus master 100 is performed at a time when error information from the bus slave 200 has been received and execution of the instruction has been fixed.

As described above, the bus request includes the mode information in the data access device 1. In accordance with this mode information, error notification by the bus master 100 and error notification by the bus slave 200 are switched. Therefore, according to the data access device 1, it is possible to achieve appropriate error notification, without separating the first bus configuration and the second bus configuration from each other as in the above-described related technique. That is, it is possible to achieve error notification by a bus master for a speculative access and error notification by a bus slave for a non-speculative access, while a circuit scale of the bus master is suppressed. Further, because one bus 400 can be shared, it is unnecessary to provide the bus 95B for the first bus configuration and the bus 95A for the second bus configuration, unlike the above-described related technique. Therefore, also with regard to this point, the circuit scale can be suppressed.

In addition, in the present embodiment, the bus master 100 includes the access information storing unit 110 that stores therein access information as described above, and notifies the error processing unit 500 of the access information stored in the access information storing unit 110 when performing error notification. Therefore, also in error notification fora speculative access, it is possible to notify the error processing unit 500 of the access information, such as an address and an access type.

Figure 8:
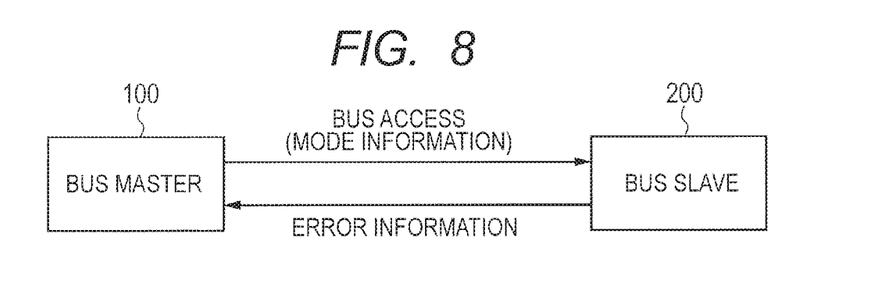
FIG. 8 is a block diagram of a configuration example of a data access device according to a second embodiment.

Furthermore, a data access device according to an embodiment can be configured to include at least the bus master 100 and the bus slave 200, as illustrated in FIG. 8. In the configuration illustrated in FIG. 8, the bus master 100 notifies the bus slave 200 of a bus request including mode information for selecting whether notification of an error for an access is performed by a bus slave or a bus master, and makes an access to the bus slave 200. In a case where the bus request includes the mode information indicating that the bus slave performs error notification, when an error for an access in this bus request has occurred, the bus slave 200 notifies any given notification destination of the error. Further, in a case where the bus request includes the mode information indicating that the bus master performs error notification, when an error for the access in this bus request has occurred, the bus slave 200 sends error information to the bus master 100. In a case of making a speculative access, the bus master 100 makes the bus request include the mode information indicating that the bus master performs error notification. Then, in a case where execution of an instruction of a speculative load access has been fixed (that is, speculation has succeeded) and error information for this load access has been received from the bus slave 200, the bus master 100 notifies any given notification destination of the error. According to this configuration, error notification by the bus master 100 and error notification by the bus slave 200 are switched in accordance with mode information. Therefore, it is possible to achieve appropriate error notification, while a circuit scale is suppressed.

Second Embodiment

Next, a second embodiment is described. The second embodiment is different from the first embodiment in that a period for retaining access information in the access information storing unit 110 is set to be shorter.

As described above, with regard to a load access of the CPU 10 to the bus slave 200 for which a speculative access does not cause any problem if being made (for example, a memory for which it has been found that a speculative access does not cause any abnormality if being made), a speculative access is made. A store access of the CPU 10 to such a bus slave 200 is a non-speculative access. That is, after execution of a store instruction has been fixed, the store access is made.

Meanwhile, to the bus slave 200 for which an unintended operation may be caused by a speculative access if the speculative access is made (for example, a peripheral I/O device), all accesses to be made are non-speculative.

In a case where a speculative access is made, it is necessary to continue to retain access information in the access information storing unit 110 also after issuance of a bus request, in order to allow the bus master 100 to perform error notification including the access information as described above. Meanwhile, in a case where a non-speculative access is made, it is unnecessary to retain the access information in the access information storing unit 110 after issuance of the bus request.

Therefore, in the present embodiment, the bus master 100 retains, for a speculative load access to the bus slave 200, access information for this access in the access information storing unit 110 at least until a response to this access (a bus response) is received from the bus slave 200. In more detail, the following operation is performed in a case where speculation is successful. Until a bus response to a speculative load access to the bus slave 200 is received and execution of an instruction of the load access is fixed, the bus master 100 retains access information for this access in the access information storing unit 110 and then deletes it. However, when error notification is required, the bus master 100 performs deletion after performing error notification. In a case where speculation fails, the following operation is performed. Until a bus response to a speculative load access to the bus slave 200 is received and cancellation of execution of an instruction of the load access is fixed, the bus master 100 retains access information for this access in the access information storing unit 110 and then deletes it.

Further, for another access to the bus slave 200 (that is, a non-speculative access), when notification of a bus request to the bus slave 200 is performed, the bus master 100 deletes access information regarding this access from the access information storing unit 110.

The second embodiment is described above. According to the present embodiment, in a case where a non-speculative access is made, access information stored in the access information storing unit 110 is deleted early. That is, it is possible to free a storage area in the access information storing unit 110 early. Therefore, it is possible to advance start of a following access.

Third Embodiment

Next, a third embodiment is described. The present embodiment is different from the first or second embodiment in that it is possible to switch a first state and a second state. The first state is a state where not only for a speculative access but also for a non-speculative access from the bus master 100, error notification is performed by the bus master 100. The second state is a state where only for a speculative access, error notification is performed by the bus master 100. The difference from the above-described embodiments is described below.

An access error caused by a programming error, such as an access to a guard area, occurs in a development phase of software to be executed by the CPU 10. In the data access device 1 described in the first or second embodiment, an error is notified from the bus master 100 and/or an error is notified from the bus slave 200 during execution of software. In a case where error notification occurs at a plurality of locations in this manner, an order of notification occurrence timings may be different from an order of instructions from software. If the order of error notifications is different from the order of the instructions from software, it is likely that debagging of software using the error notifications becomes very difficult. Therefore, in the present embodiment, the location at which error notification occurs is made one, thereby making debagging easy.

Figure 9:
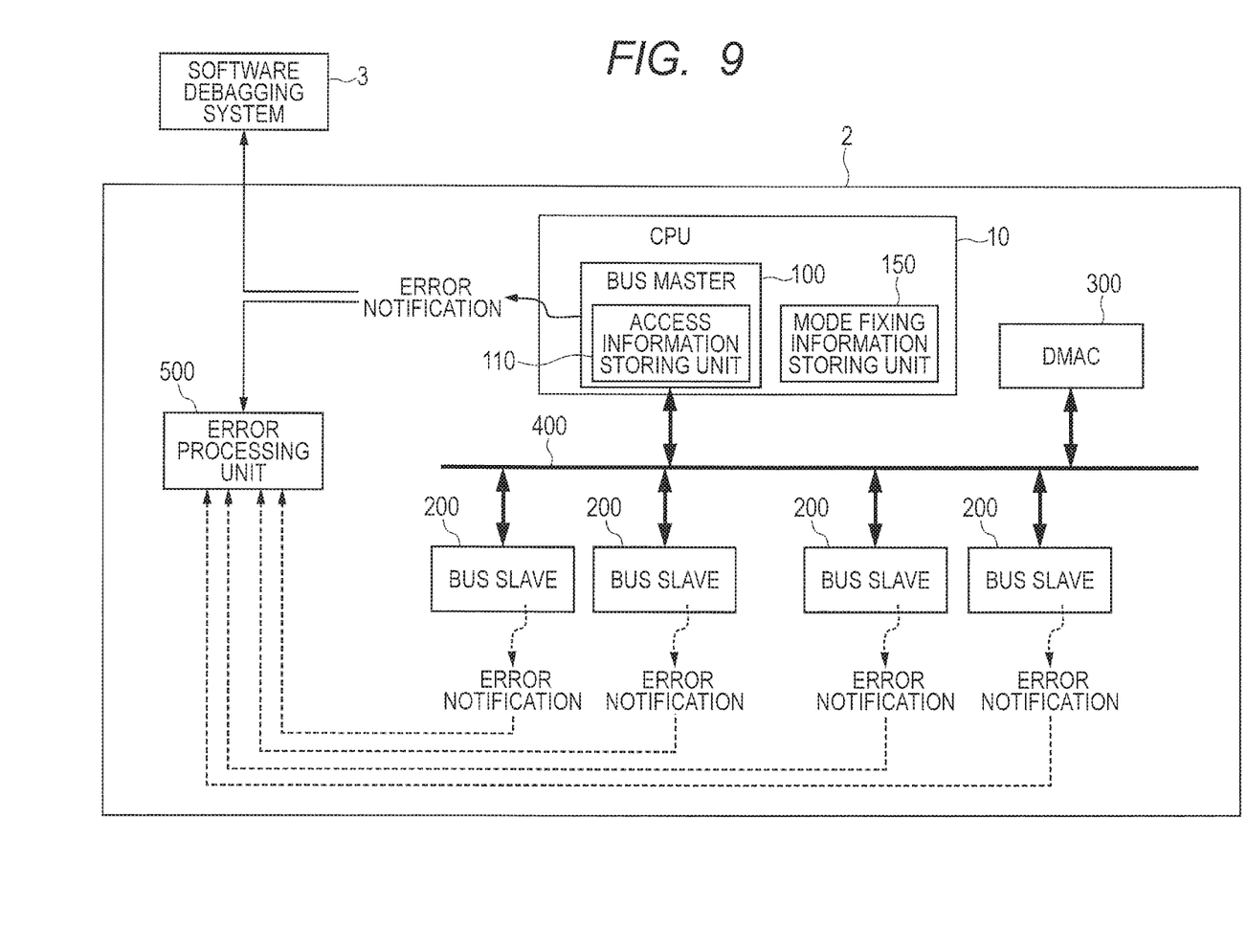
FIG. 9 is a block diagram of a configuration example of a data access device according to a third embodiment.

FIG. 9 is a block diagram of a configuration example of a data access device 2 according to the third embodiment. The data access device 2 includes a mode fixing information storing unit 150, and is different from the data access device 1 in the configuration with regard to this point.

The mode fixing information storing unit 150 is a register that stores therein mode fixing information indicating whether notification of an access error is fixed to be performed by a bus master. In the mode fixing information storing unit 150, a first value (for example, 1) and a second value (for example, 0) are stored as the mode fixing information. The first value indicates that error notification for an access from the CPU 10 is fixed to be performed by the bus master 100. The second value indicates that error notification for an access from the CPU 10 is not fixed to be performed by the bus master 100. The mode fixing information stored in the mode fixing information storing unit 150 is rewritable. Specifically, it is possible to rewrite the mode fixing information by executing a program for rewriting information stored in the mode fixing information storing unit 150 by the CPU 10, for example.

Further, in the present embodiment, the bus master 100 issues a bus request in the following manner. In a case where the above-described first value is stored in the mode fixing information storing unit 150, the bus master 100 issues a bus request that specifies "master" as a mode for all accesses. That is, irrespective of whether an access is speculative or non-speculative, the bus master 100 makes the bus request include mode information indicating that the bus master performs error notification. In a case where the above-described first value is not stored in the mode fixing information storing unit 150, in other words, in a case where the above-described second value is stored in the mode fixing information storing unit 150, the bus master 100 issues a bus request that specifies "master" as the mode when a speculative load access is made, and issues a bus request that specifies "slave" as the mode when a non-speculative access (any access other than the speculative load access) is made. That is, the bus master 100 makes the bus request include the mode information indicating that the bus master performs error notification when making a speculative load access, and makes the bus request include the mode information indicating that the bus slave performs error notification when making a non-speculative access.

Therefore, in a case where the first value is stored in the mode fixing information storing unit 150, only the bus master 100 performs error notification. Error notification by the bus slave 200 is not performed. In a case where the second value is stored in the mode fixing information storing unit 150, with regard to error notification, an operation is similar to that in the data access device 1 described in the first or second embodiment. As described above, it is possible to switch a method of performing error notification by rewriting information in the mode fixing information storing unit 150.

Further, in the present embodiment, in a case where the first value is stored in the mode fixing information storing unit 150, the CPU 10 outputs error notifications output from the bus master 100 (specifically, the contents of errors and access information) in an order of access instructions. The error notifications in the order of the instructions output from the CPU 10 are output to a software debagging system 3 coupled to the error processing unit 500 and the data access device 2. The software debagging system 3 is a computer used for debagging software by a programmer. Output of error notification from the data access device 2 to the software debagging system 3 can be performed via a dedicated interface or via the error processing unit 500, for example.

For example, while software is developed, the first value is stored in the mode fixing information storing unit 150. This makes it possible to present errors to the programmer in an order of instructions, thus making debagging of software easy. Then, until mass production of the data access device 2 is started after development of the software is finished, the second value is stored in the mode fixing information storing unit 150. Therefore, it is possible to change the configuration of the data access device 2 to the configuration in which error notification is performed by in the bus master 100 or the bus slave 200.

The third embodiment is described above. According to the present embodiment, in a case where the first value is stored in the mode fixing information storing unit 150, the bus master 100 issues a bus request that specifies "master" as a mode irrespective of a speculative access or a non-speculative access. Therefore, it is possible to temporarily change a method of error notification, thus making debagging easy.

In the above, the invention made by the inventors of the present application has been specifically described by way of the embodiments. However, it is naturally understood that the present invention is not limited to the aforementioned embodiments, and can be changed in various ways within the scope not departing from the gist thereof.

What is claimed is:

1. A data access device comprising:
a bus slave; and
a bus master that notifies the bus slave of a bus request and makes an access to the bus slave,
wherein the bus request includes mode information for selecting whether error notification for the access is performed by the bus slave or the bus master,
wherein, in a case where the mode information indicating that error notification is performed by the bus slave is included in the bus request, when an error for the access in the bus request has occurred, the bus slave performs error notification,
wherein, in a case where the mode information indicating that error notification is performed by the bus master is included in the bus request, when an error for the access in the bus request has occurred, the bus slave sends error information to the bus master,
wherein, in a case of making a speculative load access, the bus master makes the bus request include the mode information indicating that error notification is performed by the bus master, and
wherein, in a case where execution of an instruction of the speculative load access has been fixed and the error information for the load access has been received from the bus slave, the bus master performs error notification.

2. The data access device according to claim 1,
wherein the bus master includes an access information storing unit that stores therein access information, and
wherein, in a case where execution of the instruction of the speculative load access has been fixed and the error information for the load access has been received from the bus slave, the bus master notifies the error information and information stored in the access information storing unit.

3. The data access device according to claim 2, wherein, for the speculative load access to the bus slave, the bus master retains access information for the access in the access information storing unit at least until a response to the access is received from the bus slave, and
for another access to the bus slave, the bus master deletes access information for the access from the access information storing unit when notification of the bus request to the bus slave has been performed.

4. The data access device according to claim 1, further comprising a mode fixing information storing unit that stores therein mode fixing information indicating whether or not error notification for an access is fixed to be performed by the bus master,
wherein, in a case where the mode fixing information indicating that error notification for an access is fixed to be performed by the bus master is stored in the mode fixing information storing unit, the bus master makes the bus request include the mode information indicating that error notification is performed by the bus master for all accesses, and wherein, in a case where the mode fixing information indicating that error notification for an access is fixed to be performed by the bus master is not stored in the mode fixing information storing unit, the bus master makes the bus request include the mode information indicating that error notification is performed by the bus master when making the speculative load access, and makes the bus request include the mode information indicating that error notification is performed by the bus slave when making an access other than the speculative load access.

5. The data access device according to claim 4, wherein information stored in the mode fixing information storing unit is rewritable.

6. The data access device according to claim 1, further comprising an error processing unit that performs a predetermined process based on notified information,
wherein the bus master and the bus slave perform error notification to the error processing unit.

7. A data access device comprising:
a bus slave;
a first bus master and a second bus master each of which notifies the bus slave of a bus request and makes an access to the bus slave; and
a common bus to which the bus slave, the first bus master, and the second bus master are coupled,
wherein the first bus master occasionally makes a speculative access to the bus slave,
wherein the second bus master performs no speculative access to the bus slave,
wherein the bus request includes mode information for selecting whether error notification for an access is performed by the bus slave or a bus master,
wherein, in a case where the mode information indicating that error notification is performed by the bus slave is included in the bus request, when an error for the access in the bus request has occurred, the bus slave performs error notification,
wherein, in a case where the mode information indicating that error notification is performed by the bus master is included in the bus request, when an error for the access in the bus request has occurred, the bus slave sends error information to the first bus master or the second bus master,
wherein, in a case of making a speculative load access, the first bus master makes the bus request include the mode information indicating that error notification is performed by the bus master,
wherein, in a case where execution of an instruction of the speculative load access has been fixed and the error information for the load access has been received from the bus slave, the first bus master performs error notification, and
wherein, in a case of making the access to the bus slave, the second bus master makes the bus request include the mode information indicating that error notification is performed by the bus slave.

8. An access error notification method comprising:
issuing a bus request including mode information for selecting error notification for an access is performed by a bus slave or a bus master, and making an access to the bus slave, by the bus master;
in a case where the mode information indicating that error notification is performed by the bus slave is included in the bus request, when an error for the access in the bus request has occurred, notifying an error processing unit that performs a predetermined process for the error of the error, by the bus slave;

in a case where the mode information indicating that error notification is performed by the bus master is included in the bus request, when an error for the access in the bus request has occurred, sending error information to the bus master, by the bus slave;

in a case where a speculative load access is made, making the bus request include the mode information indicating that error notification is performed by the bus master, by the bus master; and in a case where execution of an instruction of the speculative load access has been fixed and the error information for the load access has been received from the bus slave, performing error notification to the error processing unit, by the bus master.

* * * * *